US 6,734,954 B2

(12) United States Patent
Reepschlager et al.

(10) Patent No.: US 6,734,954 B2
(45) Date of Patent: May 11, 2004

(54) METHOD AND SYSTEM FOR AUTOMATIC RAMAN GAIN CONTROL

(75) Inventors: Paul M. Reepschlager, Nepean (CA); Patrick Pilot, Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/824,798

(22) Filed: Apr. 4, 2001

(65) Prior Publication Data

US 2002/0163635 A1 Nov. 7, 2002

(51) Int. Cl.[7] ............................................... G01N 21/00
(52) U.S. Cl. ...................................................... 356/73.1
(58) Field of Search ........................ 356/73.1; 385/122, 385/27, 15, 30; 359/330–337, 326, 327, 124, 160, 134, 138, 237

(56) References Cited

U.S. PATENT DOCUMENTS

2001/0036347 A1 * 11/2001 Hansen et al. .............. 385/123
2001/0050807 A1 * 12/2001 Deguchi et al. ....... 359/341.44
2002/0097481 A1 * 7/2002 Du et al. ..................... 359/334

* cited by examiner

Primary Examiner—Tu T. Nguyen
(74) Attorney, Agent, or Firm—G. Ronald Bell & Associates

(57) ABSTRACT

The present invention provides a closed loop control strategy using system wavelength profile information to provide accurate derivation of Raman gain in a fiber optic span. The present invention overcomes prior art limitations in which a desired Raman gain is estimated on the basis of a modeled solution, without taking into account the dynamic nature of the system span profiles. The method and system according to the present invention provide an improved method of calculating Raman gain which permits dynamic adjustments to system parameters, thus correcting gain inaccuracies induced by the application of known models and permitting an accurate derivation of the Raman gain. Cost-effective optical spectrum analyzers are used to monitor wavelength profiles, which permits the mapping of transmit and receive profiles within a span. This mapping information is then collected in a central location, such that the Raman gain within the span may be derived.

22 Claims, 2 Drawing Sheets

METHOD AND SYSTEM FOR AUTOMATIC RAMAN GAIN CONTROL

CROSS-REFERENCE TO RELATED APPLICATION

This application is related to the co-pending and commonly-assigned application Ser. No. 09/824,799, filed on same date herewith, by Paul Reepschlager, entitled "Methods and System for Automatic Optical Fiber Type Identification."

FIELD OF INVENTION

The present invention relates to fiber optics as well as to measuring gain in amplified fiber optic spans.

BACKGROUND OF THE INVENTION

It is known in the art that one manner of obtaining additional optical gain in an amplified fiber optic span is by pumping the line fiber with high-energy photon (low wavelength) lasers. In the resulting "Raman effect", high-energy photons are absorbed by the fiber and may be re-emitted in the form of stimulated emission in the presence of longer wavelength photons, thus resulting in amplification. The gain profile for the stimulated re-transmission has a finite width. Signal gain across a wide spectral profile may involve the superposition of gain profiles for several Raman pumps.

Using adequate pump wavelengths to provide gain across a signal band, a known model can be derived to predict the relative pump powers required to achieve a desired gain profile through pump gain profile superposition, while taking into account several secondary non-linear fiber optic effects as well.

In the prior art, a closed loop system has been employed which monitors system span profile parameters for gain derivation. The desired Raman gain is then estimated on the basis of a modeled solution. However, this implementation does not take into account the dynamic nature of the system span profiles. Consequently, in cases where the system span profiles are dynamic in nature, the known gain control model (algorithm) will fail. Furthermore, Raman gain estimation on the basis of a modeled solution often itself employs an open loop gain implementation, and the resulting gain profile is not corrected.

U.S. Pat. No. 6,081,323 issued to Mahgerefteh et al. on Jun. 27, 2000, teaches a method and apparatus for the measurement of Raman gain spectrum in an optical fiber. This patent, however, describes the determination of Raman gain spectrum and is silent on the measurement of Raman gain.

Therefore, there is a need for an improved method of calculating Raman gain which permits dynamic adjustments to system parameters, thus correcting gain inaccuracies induced by the application of known models and permitting an accurate derivation of the Raman gain.

SUMMARY OF INVENTION

Accordingly, it is an object of the invention to provide a closed loop control strategy using system wavelength profile information to provide accurate derivation of Raman gain in a fiber optic span.

It is another object of the invention to provide a manner in which Raman gain may be measured in real-time, in service.

The term "power profile" will be used herein as a generic term to describe either a gain profile or a loss profile.

According to one aspect of the invention, there is provided a method of dynamically determining a Raman gain profile of an optically amplified fiber optic span, said method comprising the steps of: measuring a power profile for each of a plurality of system components; transmitting the measured power profiles to a central location; transmitting changes in the measured power profiles to the central location; and dynamically calculating the Raman gain profile for the system based on the changes in the measured power profiles.

According to another aspect of the invention, there is provided a system for dynamically determining a Raman gain profile of an optically amplified fiber optic span, said system comprising: optical spectrum analyzers for measuring a power profile of said fiber optic span and of a plurality of system components so as to determine the existence of a loss or a gain therein; means for receiving the measured power profiles from the optical spectrum analyzers, and for receiving changes in the measured power profiles; and means for dynamically calculating the Raman gain profile for the system based on the changes in the measured power profiles.

BRIEF DESCRIPTION OF THE DRAWINGS

Embodiments of the present invention will be further described with reference to the accompanying drawings, in which.

DETAILED DESCRIPTION OF THE INVENTION

The present invention postulates that, if collected in a central location, mapping information related to monitored wavelength profiles in a system can be utilized to derive the Raman gain within a span.

Figure 1:
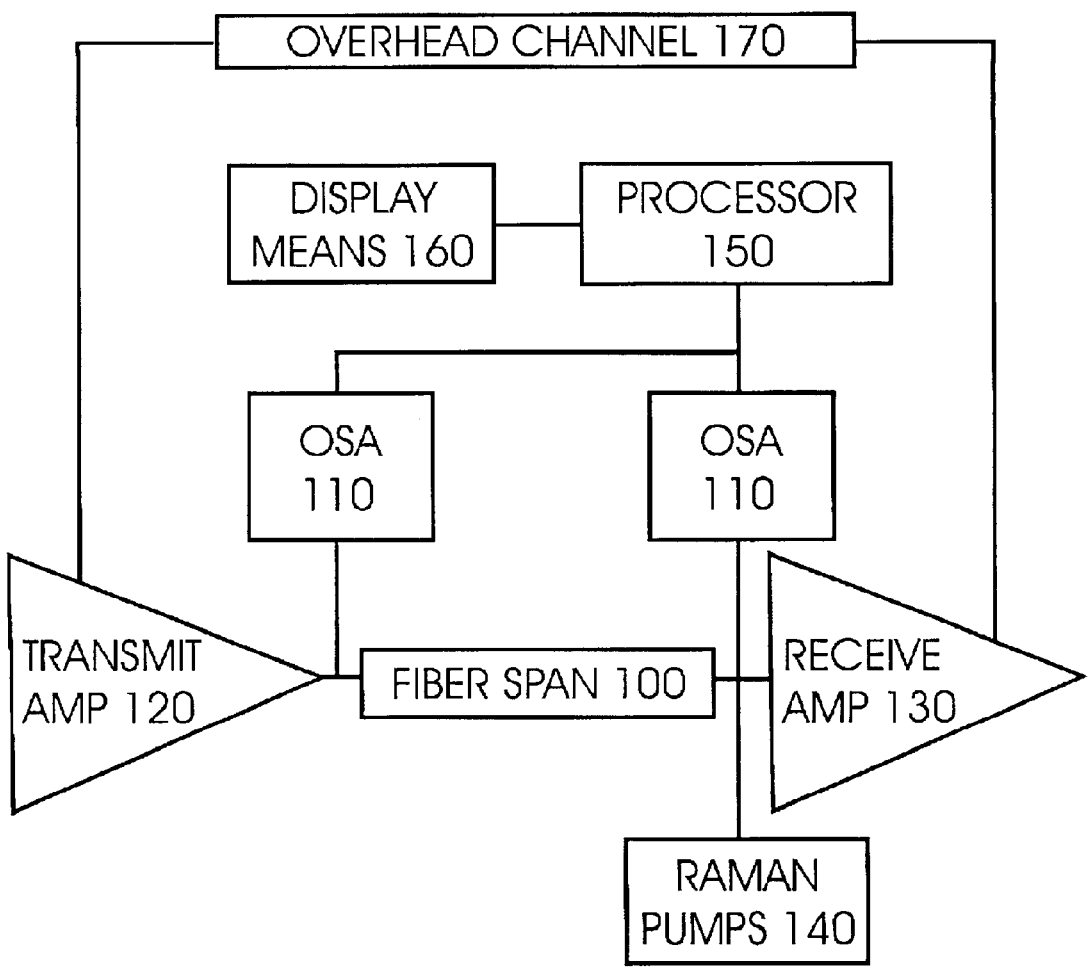
FIG. 1 illustrates diagrammatically a system for determining Raman gain in accordance with an embodiment of the present invention.

FIG. 1 illustrates a system for determining Raman gain in a fiber optic span in accordance with an embodiment of the present invention. Cost-effective optical spectrum analyzers (OSAs) 110 are provided in order to monitor wavelength power profiles, which permits the mapping of transmit and receive profiles within a fiber optic span 100. If collected at a central location, such as at processor 150, this mapping information may be utilized to derive the Raman gain within the span. In an embodiment of the present invention, the processor 150 is located at the receiving end of the span 100.

The following information is necessary in order to determine the spectral contribution (G3) of Raman pumps 140 incident on the receive amplifier 130: the originating profile (P1) of up-stream transmit amplifier 120; the loss profile (L2) for fiber optic span 100; and the profile (P4) measured at the input to the receive amplifier 130. The value of the Raman gain spectral contribution (G3) may be determined using the following equation:

$$P4(\lambda) = P1(\lambda) + G3(\lambda) - L2(\lambda), \text{ or}$$

$$G3(\lambda) = P4(\lambda) - P1(\lambda) + L2(\lambda)$$

Calculation of $G3(\lambda)$ is preferably performed at the receiving end. This calculation may be performed automatically by the processor 150, or by any other means capable of doing so. Alternatively, this calculation may be performed manually. Advantageously, the result of this calculation may be displayed on a display means 160.

Using this method in accordance with the present invention, the gain and ripple in the Raman gain profile will both be directly mapped as opposed to being estimated through reliance on model equations. The measurement of an actual spectral profile at the receive amplifier 130 by optical spectrum analyzer 110 permits pre-compensation of the Raman gain profile to be implemented and tracked with a high level of confidence.

Some level of inaccuracy may be expected in the derived Raman Gain profile. This inaccuracy will be manifested in OSNR (optical signal to noise ratio) results. Thus, as an outside loop in the control technique, a central body must be able to dictate Raman gain set-points across the spans to ensure that the end OSNR results are met.

The determination of the Raman gain using the above technique will only be effective if the dynamic nature of the transmit amplifier profile and the loss profile can be tracked.

First, consider changes in the transmit amplifier profile, $P1(\zeta)$. To properly map the Raman gain profile, information about the profile $P1(\lambda)$ of up-stream transmit amplifier 120 should be fed downstream to the receive amplifier 130. A continual spectral profile update strategy, however, may strain usage of an overhead channel 170. Therefore, in a preferred embodiment, it is proposed that only status updates be conveyed on a regular basis from the transmit amplifier. That is, once complete information about the transmit spectral profile $P1(\lambda)$ has been conveyed to the receiver amplifier 130, regular message updates pertaining to the general operating conditions of the transmit amplifier 120 can advantageously be sent over the overhead channel 170. A tolerance band may be defined in the transmit amplifier profile $P1(\lambda)$, within which minor localized changes in its output gain and ripple would not warrant a complete update of its spectral content information to the receive amplifier 130. Only under changes causing an "event" in the transmit amplifier's output operating profile would a complete profile update be sent. An event may be any one of: a profile change outside of the tolerance band, wavelength additions, loss of wavelengths, etc.

If congestion of the overhead channel momentarily detains communication of complete spectral updates from the transmit amplifier, then, in another embodiment, a method may be put in place to convey only basic information across the overhead channel (such as wavelength x has been added with power y). Short term reliance on the open loop Raman amplifier model equations (resident with the Raman circuit pack) would be permitted to make limited independent adjustments to the Raman pumps 140 in order to accommodate transmitted profile changes. Closed loop corrective measures may be implemented when the complete up-stream information can be conveyed across the overhead channel.

Next, consider changes in the fiber loss profile, $L2(\lambda)$. Any Raman gain derivation technique that treats the fiber loss profile as a static entity should cause some concern. Under such conditions, any degradation to the passive elements in the system (such as that due to temperature variations) would result in false estimates of the Raman gain. Therefore, whether the fiber loss profile is initially procured through measurement techniques, or estimated based on typical fiber characteristics, this profile information will need to be dynamic, being updated periodically based on receive amplifier OSA measurements.

The question remains: how can one determine whether changes have occurred within the span profile? According to the invention, the answer lies again in knowledge of conditions in the rest of the span. Input spectral profile information can be measured at the receive amplifier 130. If this input profile, P4(X), changes, but it is known that the booster output profile, P1(X), has remained consistent, and output power monitor conditions remain unchanged on the Raman pumps 140 (total power as well as individual pump powers), then the changes can be inferred to have occurred along the transmission medium.

Once the measurements of gain and loss profiles have been made, it is necessary to determine the change in the gain or loss profile. Two situations are discussed below: correction of the gain profile during initial system setup; and correction of the loss profile in service, when active parameters have not changed. First, the correction of gain profile during initial system set-up is considered. In initially setting up a span, there must be a preliminary understanding of system parameters in order to determine the amount of Raman gain required. In the present invention, a desired Raman gain profile can be chosen knowing the following values: the output of the transmit amplifier, $P1(\lambda)$; the desired profile at the receive amplifier input, $P4(\lambda)$; and an initial condition profile for the span loss, $L2(\lambda)$. A model is used to set the Raman pump powers to achieve the desired Raman gain profile, and the resulting measured gain will be:

$$G3_{measured}(\lambda)=P4_{measured}(\lambda)-P1_{known}(\lambda)+L2_{initial}(\lambda)$$

This may differ from the desired profile due to model errors for the Raman gain. Hence, initial offset adjustments can be made to the pump powers to achieve:

$$G3_{measured}(\lambda)=G3_{desired}(\lambda)$$
$$=P4_{measured}(\lambda)-P1_{known}(\lambda)+L2_{initial}(\lambda)$$

It should be noted that the loss profile is assumed to be correct (due to measurement or due to inferred profile based on typical fiber characteristics). This is a necessary starting point.

Next, consideration is given to the correction of the loss profile in service, when active parameters have not changed. With any intended modification to the Raman gain profile, it must be assumed that the fiber loss profile is correct and static. This implies that, under steady state transmit amplifier and Raman amplifier operating conditions, the loss profile must be monitored and updated accordingly to account for environmental impacts upon it.

A change in the loss profile will be noticed as a change of the profile incident upon the receive amplifier. Under conditions wherein $P1(\lambda)$ has not changed and the Raman pumps are kept at a given operating point, changes in $P4(\lambda)$ may be attributed to a change in the loss of the transmission fiber $L2(\lambda)$. However, a change in $L2(\lambda)$ will result in a change in $G3(\lambda)$ through a change in the effective length of the Distributed Raman amplifier.

Therefore, before the change in fiber loss:

$$P4(\lambda)=P1(\lambda)+G3(\lambda)-L2(\lambda)$$

After the small change $\Delta$ in the received power at P4:

$$P4(\lambda)+\Delta(\lambda)=P1(\lambda)+G3(\lambda)-\delta_G(\lambda)-L2(\lambda)-\delta_L(\lambda)$$

Where $\Delta(\lambda)=\delta_G(\lambda)+\delta_L(\lambda)$, and $\delta_G(\lambda)$ is the change in the Raman gain profile and $\delta_L(\lambda)$ is the change in the fiber loss spectrum and is much smaller that $L2(\lambda)$.

Since it is very difficult to provide a simple method which (in low computational time) may determine $\delta_G(\lambda)$ and $\delta_L(\lambda)$, a simple linear approximation is used. As an initial supposition, consider $\delta_G(\lambda)$ as being very small compared to $\delta_L(\lambda)$. As such, since the entire change in P4($\lambda$) will be attributed to a change in the loss profile, $\delta_L(\lambda)$ can be calculated very easily ($\Delta_{measured}(\lambda)=\delta_L(\lambda)$). If the assumption is made that the change in fiber loss is equally distributed all along the transmission fiber, a change in the loss per unit length ($\Delta\alpha$) can be derived from $\delta_L(\lambda)$ As a second step in the analysis, it is then desirable to estimate the change in Raman gain occurring from the change in the fiber loss, since (as a counter to the initial supposition) there does exist a finite change to $\delta_G(\lambda)$. In the linear regime, the Raman amplification depends only on three parameters: the Raman gain coefficient (Cr), the pumping power (P) and the absorption per unit length at the pumping wavelength ($\alpha$). In fact, it can be found that for a particular pump (i):

$$\delta_{G,i} = \frac{-4.343 C_{r,i} P_i \Delta\alpha}{\alpha_i^2}$$

Cr and P are constants in the present case, $\alpha$ is known from the previous iteration while $\Delta\alpha$ has been estimated previously. For a given signal wavelength, $\delta_G$ can then be estimated by adding the contribution from each pump.

The $\delta^L(\lambda)$ parameter can then be re-estimated by subtracting $\delta_G(\lambda)$ from the measured value $\Delta(\lambda)$:

$$L2(\lambda)_{updated}=L2(\lambda)_{previous}+\delta_L(\lambda)=L2(\lambda)_{previous}+[\Delta(\lambda)-\delta_G(\lambda)]$$

Since it desirable to maintain a time-invariant profile into the receive amplifier, loss profile updates imply a need for Raman gain profile updates, since the Raman gain profile set-point is a function of the loss profile. Once adjustments to the Raman pump powers have been made to account for changes to the loss profile, the resultant gain profile measurement can be made:

$$G3_{measured}(\lambda)=P4_{measured}(\lambda)-P1_{known}(\lambda)+L2_{updated}(\lambda)$$

and corrective offset adjustments can be applied to the Raman pumps.

Updates to the loss profile and Raman Gain profile may be made regularly in incremental iterative steps.

In calculating the Raman gain, it is important to know if passive losses that may exist at the receiving end (i.e. patch panel loss, filter losses . . . ) factor into the equation. If so, there is the potential for a large unknown offset on the measured gain.

Figure 2:
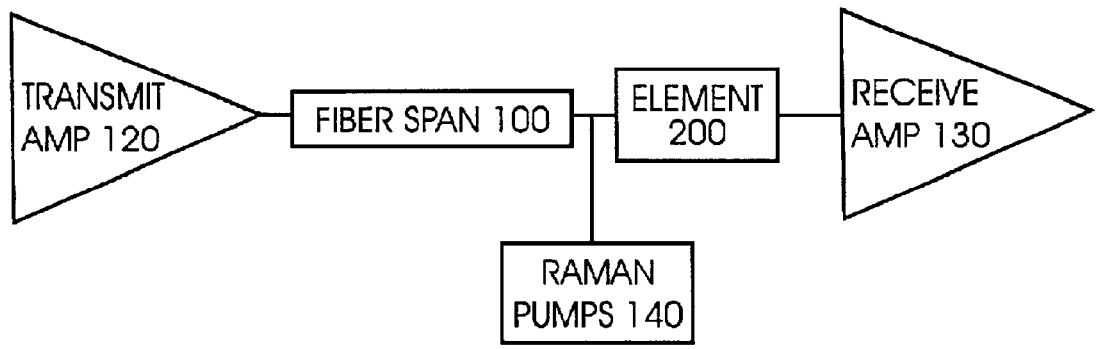
FIG. 2 illustrates diagrammatically a consideration of passive losses at the receiving end of a system according to FIG. 1.

FIG. 2 is a modification of the concepts presented in earlier. Here an extra element 200, with a loss profile of C5 has been added to account for the static passive losses that will appear at the receiving end. Two other parameters are considered as well: L2' and P4'. The profile P4, at the input of receive amplifier 130, is measured after the static losses, C5. The equivalent profile measurement without static losses is P4'. Since loss profile measurements, L2, will also be made at the input to the dual amplifier, the loss due to the fiber alone (without C5) is noted in the diagram as L2'. Raman gain, G3, needs to be defined as the actual gain derived by pumping the fiber. Hence, when setting up pump powers to deliver fiber gain, one should account for the additional static loss C5 (relatively easy to do with closed loop gain control).

Having defined parameters above, consider how the Raman gain is derived.

$$G3(\lambda)=P4(\lambda)-P1(\lambda)+L2(\lambda)$$

with P4 and L2 measured at the dual amplifier input.

But in this case, L2($\lambda$)=L2'($\lambda$)+C5 and P4($\lambda$)=P4'($\lambda$)−C5

Thus:

$$G3(\lambda)=P4'(\lambda)+C5-P1(\lambda)+L2'(\lambda)-C5=P4'(\lambda)-P1(\lambda)+L2'(\lambda)$$

Therefore, the calculation of G3 using measured parameters L2 and P4 is insensitive to the static losses on the receiving side.

Measurement of the loss profile can be effected under start of life, non-traffic-carrying conditions. If the transmit amplifier pumps are turned up to deliver superfluous (high power) Amplified Spontaneous Emission (ASE), this launched ASE profile could first be measured at the amplifier output using the OSA, and then measured at the receiving dual amplifier input. The difference between the profiles would be the mapping of the span loss profile.

As a first step, the Raman pump power settings need to be calculated relative to the fiber loss profile in order to achieve a specified Raman gain profile. For this reason, the fiber loss profile needs to be measured (or estimated by a typical value).

As a second step, it is useful to determine the Raman gain spectrum provided by each pump. The combined Raman flat gain profile is the result of the superposition of several individual pump wavelength profiles, as illustrated in FIG. 3.

Figure 3:
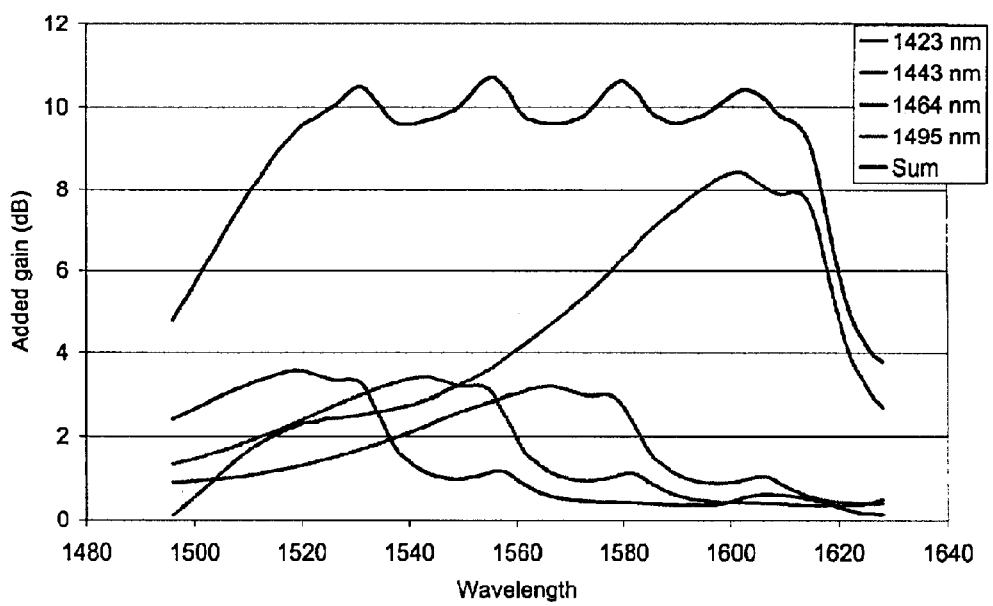
FIG. 3 illustrates graphically individual pump wavelength profiles as well as a superposition of a single pump Raman gain profile in a system according to FIG. 1.

It is evident from FIG. 3 that the shapes of the pump profiles must be known to permit an effective superposition. The shape is empirically determined, and is dependent on fiber type.

A caveat lies in the reliability of using a pre-determined per-fiber-type typical Raman pump profile when implementing a solution. This use does not allow for tolerance variations with same-type fibers. One solution to this problem is accomplished by measuring the pump profile on-site. Under the same start of life (traffic free) conditions used in determining the loss profile, each pump wavelength can be turned up independently, and the resultant profile mapped at the receive amplifier. The resultant profile is derived through the difference between the ASE profile incident on the receiver amplifier before and after the Raman pump power application. This technique would be particularly valuable in a situation wherein a foreign fiber type has previously been spliced into a span, and the typical profile for the dominant fiber type may not be applicable.

It was mentioned earlier, with respect to the correction of gain profile during initial system set-up, that during system initialization, the Raman gain model provides pump set-points which may be non-optimal due to model inaccuracies. That is, the resulting gain profile will be measured through $$G3_{measured}(\lambda)=P4_{measured}(\lambda)-P1_{known}(\lambda)+L2_{initial}(\lambda)$$

and this measured profile may not match the desired profile. Pump offsets may be necessary to achieve:

$$G3_{measured}(\lambda)=G3_{desired}(\lambda)$$

Therefore, as a third step in the start of life initialization procedure, it is possible to provide an initial estimate of this offset to provide a first order of correction to the model before traffic is activated onto the link.

Under the transmitter amplifier ASE condition, if the Raman pumps were then activated to provide a pre-determined (modeled) gain, that resultant gain can be measured at the receive amplifier. This provides a method for comparing the gain provided by the model against empirical observation.

Furthermore, if a link budget analysis has dictated that the Raman gain within a span is to have a value Y, two other gain values can be measured using the above procedure, X being a value marginally below the desired point, and Z being a value marginally above the desired point. The error between the set-point gain X and measured results can be obtained. Likewise, the error between the set-point gain Z and measured results can be obtained. From interpolation between these error results, a linear function on the expected error in the gain Y can be found and used to first provide initial pump offsets on the model, and then for adjustment purposes.

What is claimed is:

1. A method of determining a Raman gain profile of an optically amplified fiber optic span, said method comprising the steps of:

obtaining a first measured power profile for each of a plurality of system components;

applying one or more Raman pumps to said fiber optic span for providing additional optical amplification thereto;

obtaining a second measured power profile for each of said plurality of system components; and calculating the Raman gain profile for the system components based on the difference in the measured power profiles.

2. A method according to claim 1 wherein power settings for the Raman pump are calculated relative to a loss profile of a fiber optic span measured under non traffic-carrying conditions in order to achieve a specified Raman gain profile.

3. A method according to claim 1 wherein said steps of obtaining said measured power profiles for each of said plurality of system components include measuring: an originating profile at an output of a transmit amplifier, a loss profile of a fiber optic span, and an incident profile at an input of a receive amplifier.

4. A method according to claim 3 wherein if the incident profile changes, and it is known that the originating profile remains unchanged and the output power monitor conditions remain unchanged on the Raman pumps, it is determined that changes in the measured power profiles have occurred along the fiber optic span.

5. A method according to claim 1 wherein said step of obtaining said measured power profile for each of said plurality of system components includes measuring: an originating profile at an output of a transmit amplifier, a loss profile of a fiber optic span, and an incident profile at an input of a receive amplifier.

6. A method according to claim 1 further comprising the steps of:

continually monitoring power profiles of each of said plurality of system components after application of said one or more Raman pumps;

transmitting any change in said power profiles to a central location; and recalculating, in real-time, the Raman gain profile following such change.

7. A method according to claim 6 wherein the step of transmitting any change in said power profile comprises conveying basic information over an overhead channel.

8. A method according to claim 6 wherein the step of transmitting any change in said power profile is performed when the magnitude of the change is outside limits defined by a tolerance band.

9. A method according to claim 6 wherein said step of measuring a power profile for each of a plurality of system components includes measuring: an originating profile at an output of a transmit amplifier, a loss profile of a fiber optic span, and an incident profile at an input of a receive amplifier.

10. A method according to claim 9 wherein the step of transmitting any change in said power profile comprises conveying a status update on a regular basis from the transmit amplifier.

11. A method according to claim 9 wherein said step of recalculating the Raman gain profile comprises summing updated values of the incident profile and the loss profile, and subtracting therefrom the originating profile.

12. A method according to claim 9 wherein said step of recalculating the Raman gain profile is performed at said receive amplifier.

13. A system for determining a Raman gain profile of an optically amplified fiber optic span, said system comprising:

a plurality of optical spectrum analyzers for measuring first and second power profiles of said fiber optic span and of a plurality of system components, said first power profile being measured before application of one or more Raman pumps to said fiber optic span, and said second power profile being measured after application of said one or more Raman pumps, so as to determine the existence of a loss or a gain therein;

means for receiving the measured power profiles from the optical spectrum analyzers; and means for calculating the Raman gain profile for the system components based on the difference in the measured power profiles.

14. A system according to claim 13 further comprising a display means for displaying the result of said calculation.

15. A system according to claim 13 wherein the means for receiving comprises a processor.

16. A system according to claim 13 wherein the means for calculating comprises a processor.

17. A system according to claim 13 wherein the means for receiving and the means for dynamically calculating are integral with one another.

18. A system according to claim 13 wherein said system components include a transmit amplifier and a receive amplifier.

19. A system according to claim 18 wherein said means for receiving and said receive amplifier are integral with one another.

20. A system according to claim 18 wherein said means for receiving, said means for dynamically calculating, and said receive amplifier are all integral with one another.

21. A system according to claim 13 further comprising an overhead channel for conveying the changes in the measured power profiles.

22. A system according to claim 13 further comprising:

means for continually monitoring power profiles of each of said plurality of system components after application of said one or more Raman pumps;

means for transmitting any change in said power profiles to a central location; and means for recalculating, in real-time, the Raman gain profile following such change.

* * * * *